United States Patent [19]

Storms

[11] Patent Number: 4,521,437

[45] Date of Patent: Jun. 4, 1985

[54] POUCHES OF ETHYLENE/OCTENE-1 COPOLYMER FILM CONTAINING A FLOWABLE MATERIAL

[75] Inventor: William J. Storms, Oshawa, Canada

[73] Assignee: Du Pont Canada Inc., Mississauga, Canada

[21] Appl. No.: 500,386

[22] Filed: Jun. 2, 1983

[30] Foreign Application Priority Data

Jun. 2, 1982 [GB] United Kingdom ............... 82016100

[51] Int. Cl.$^3$ ................ A23G 9/04; B32B 27/34; B32B 27/08

[52] U.S. Cl. ...................... 426/130; 428/35; 428/323; 428/328; 428/192; 428/408; 428/516; 428/518; 428/347; 428/702; 428/689; 156/198; 426/129; 426/127

[58] Field of Search .............. 428/516, 35, 192, 518, 428/323, 328, 408; 426/130

[56] References Cited

U.S. PATENT DOCUMENTS

| | | | |
|---|---|---|---|
| 3,682,767 | 8/1972 | Britton et al. | 428/518 X |
| 4,346,834 | 8/1982 | Macumdar | 428/516 X |
| 4,356,221 | 10/1982 | Anthony et al. | 428/516 X |
| 4,357,191 | 11/1982 | Bullard et al. | 428/516 X |
| 4,405,667 | 9/1983 | Christensen et al. | 428/516 X |

*Primary Examiner*—Patricia C. Ives

[57] ABSTRACT

Pouches containing a flowable material e.g. milk, ice cream, are made of a sealant film which is from about 50 to 100 parts by weight of a linear copolymer of ethylene and a $C_6$–$C_{10}$ α-olefin, and from 0 to 50 parts by weight of at least one polymer selected from linear copolymer of ethylene and a $C_4$–$C_{10}$ α-olefin, and a high-pressure polyethylene. The sealant film is selected on the basis of providing (a) pouches with an M-test value substantially better, at the same film thickness, than that obtained with pouches made with film of a specified blend of an ethylene-butene copolymer and a high pressure polyethylene, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters. The M, M(2) and M(1.3)-tests are defined pouch drop tests. The pouches may also be made from composite films in which the sealant film forms at least the inner layer.

13 Claims, No Drawings

POUCHES OF ETHYLENE/OCTENE-1 COPOLYMER FILM CONTAINING A FLOWABLE MATERIAL

The invention relates to pouches filled with flowable materials, e.g. liquids, particularly to pouches made on so-called vertical form and fill machines.

It is well known to package flowable materials, for example, milk, on a so-called vertical form and fill machine. Using such a machine, a flat web of synthetic thermoplastic film is unwound from a roll and formed into a continuous tube in a tube forming section, by sealing the longitudinal edges on the film together to form a so-called lap seal of a so-called fin seal. The tube thus formed is pulled vertically downwards to a filling station. The tube is then collapsed across a transverse cross-section of the tube, the position of such cross-section being at a sealing device below the filling station. A transverse heat seal is made, by the sealing device, at the collapsed portion of the tube, thus making an air-tight seal across the tube. The sealing device generally comprises a pair of jaws, and is described more fully hereinbelow. After making the transverse seal, but before the jaws of the sealing device are opened a pre-set quantity of material to be packaged e.g. liquid, is allowed to enter the tube, at the filling station, and fill the tube upwardly from the aforementioned transverse seal. The tube is then allowed to drop a predetermined distance under the influence of the weight of the material in the tube. The jaws of the sealing device are closed again, thus collapsing the tube at a second transverse section, which is above, usually just above, the air/material interface in the tube. The sealing device seals and severs the tube transversely at said second transverse section. The material-filled portion of the tube is now in the form of a pillow shaped pouch. Thus the sealing device has sealed the top of the filled pouch, sealed the bottom of the next-to-be-formed pouch and separated the filled pouch from the next-to-be-formed pouch, all in one operation.

One vertical form and fill machine of the type described above is a Prepac*IS-6 liquid packaging machine.

*denotes trademark.

A sealing device commonly used is a so-called impulse sealer which has a sealing element mounted in sealing jaws and electrically insulated therefrom. In operation the sealing jaws are closed and an electrical current is caused to flow through a sealing element e.g. a wire, for a fraction of the time that the jaws are closed. The jaws remain closed during a cooling period, during which the seals partially solidify, before the sealing jaws are opened. The transverse seal thus obtained supports the weight of the flowable material e.g. liquid, in the next-to-be-formed pouch.

A sealing element made of round wire e.g. "piano" wire about 1.6 to 2.5 mm diameter, electrically insulated from a water cooled supporting jaw, may be used, but a wire of rectangular cross-section is preferred. These types of sealing element may be used for making both the longitudinal and transverse seals.

The temperature of the sealing element during passage of the electrical current is largely determined by the resistance of the sealing element, the voltage applied across the element, the heat transfer rate through the film being sealed and the temperature and mass of the jaws of the sealing device. Operation of the impulse sealer may affect the seal strength and it is desirable, therefore, to optimize such operation.

When a liquid is packaged in pouches as described above, the liquid, especially if aqueous, aids in cooling the transverse seal in the tube after the sealing jaws are opened, because of the liquid's relatively high thermal conductivity. It is believed that the cooling effect of the liquid on the seal takes effect before the weight of the liquid can weaken or rupture the bottom seal.

U.S. Pat. No. 3,682,767 issued 1979 Aug. 8 to Britton et al, discloses liquid filled pouches made from films of blends of (a) 90–50 wt. % of a random copolymer of ethylene and an olefinic unsaturated monomer selected from the group consisting of vinyl acetate, methyl methacrylate, ethyl acrylate, styrene, vinyl methyl ether, diisobutylene, methacrylic acid and acrylonitrile, which is present in the amount of 2–10 wt% of the copolymer and (b) 10–50% of a linear copolymer of ethylene and a $C_3$–$C_{20}$ α-olefin of a density of about 0.93 to 0.96 g/cm$^3$.

It is more common, commercially, to use film made from a blend containing 70–90% linear ethylene/butene-1 copolymer having a density of about 0.919 g/cm$^3$ and a melt index of about 0.75 dg/min and 10–30% high pressure polyethylene i.e. a homopolymer, having a melt index of about 2 to 10 and a density of from 0.916 to 0.924 g/cm$^3$. Density is determined by ASTM Procedure D1505-68 and melt index by ASTM Procedure D1238-79 (Condition E). Such films having a thickness of about 76 micrometers, have been used for making pouches containing about 1.3 liters of milk. Pouches made from such film are generally satisfactory from the standpoint of pouch toughness and puncture resistance, but suffer from a tendency to have weak transverse end and/or longitudinal seals even though the operating conditions of the impulse sealer have been optimized. Defective seals may lead to the phenomenon known as "leakers", in which the flowable material e.g. milk, may escape from the pouch through pinholes which develop at or close to the seal. It has been estimated that leakers account for about 1–2% of the 1.3 liter milk pouch production.

It has been proposed that increasing the film thickness would overcome the problem of leakers. However, it has been shown that even at film thicknesses of up to about 127 micrometers the percentage of leakers is not substantially reduced and yet the cost of the unfilled pouch is increased in proportion to the increase in thickness of the film.

It has been suggested that melt strength, hot tack strength and heat-seal strength would be good measures on which to select films to produce pouches having improved seal integrity and therefore reduce the number of leakers. On these bases, however, it appears that one skilled in the art would not have any reason to believe that other polyolefins or blends of polyolefins perform any better than the aforementioned blend of linear ethylene/butene copolymer and high pressure polyethylene. Surprisingly, however, it has now been found that pouches made from certain films of copolymers of ethylene and a $C_6$–$C_{10}$ α-olefin give substantially better performance with respect to the problem of leakers. Indeed, because of this improved performance it is possible to make pouches of film with thinner film than was heretofore thought possible with the aforementioned film of the blend of ethylene/butene copolymer and high pressure polyethylene.

Accordingly the present invention provides a pouch containing a flowable material, said pouch being made from a sealant film in tubular form and having transversely heatsealed ends, said sealant film being made from a material comprising about 50 to 100 parts by weight of a linear copolymer of ethylene and a $C_6$–$C_{10}$ α-olefin having a density of from 0.916 to 0.930 g/cm$^3$ and a melt index of 0.3 to 2.0 dg/min, and from 0 to 50 parts by weight of at least one polymer selected from the group consisting of a linear copolymer of ethylene and a $C_4$–$C_{10}$ α-olefin having a density of from 0.916 to 0.930 g/cm$^3$ and a melt index of from 0.3 to 2.0 dg/min, a high-pressure polyethylene having a density of from 0.916 to 0.924 g/cm$^3$ and a melt index of from about 1 to 10dg/min and blends thereof, said sealant film being selected on the basis of providing (a) pouches with an M-test value substantially smaller, at the same film thickness, than that for pouches made with film of a blend of 85 parts of a linear ethylene/butene-1 copolymer having a density of about 0.919 g/cm$^3$ and a melt index of about 0.75 dg/min and 15 parts of a high pressure polyethylene having a density of about 0.918 g/cm$^3$ and a melt index of 8.5 dg/min, or (b) an M(2)-test value of less than about 12%, for pouches having a volume of from greater than 1.3 to 5 liters, or (c) an M(1.3)-test value of less than about 5% for pouches having a volume of from 0.1 to 1.3 liters.

In a preferred embodiment, the pouches have an M-test value at least 30% less than that for pouches made from film of said blend of ethylene-butene copolymer and high pressure polyethylene.

In another embodiment the sealant film is made from a blend of from 60 to 100 parts by weight of an ethylene/octene-1 copolymer having a density of from 0.916 to 0.930 g/cm$^3$ and a melt index of 0.3 to 2.0 dg/min and from 0 to 40 parts by weight of a high pressure polyethylene having a density of from 0.916 to 0.924 g/cm$^3$ and a melt index of from about 1 to 10 dg/min.

In yet another embodiment the sealant film is made using a blown film process in which process the blown film is cooledd by passing the film in close proximity to a cooled metal mandrel. In a preferred embodiment the cooled metal mandrel is in close proximity to the inside surface of the blown film.

In another embodiment the sealant film for pouches having a volume of greater than 1.3 liters is selected on the basis of providing an M(2)-test value of less than 6%, and especially less than 3%.

In a further embodiment the sealant film for pouches having a volume of 0.1 to 1.3 liters is selected on the basis of providing an M(1.3)-test value of less than 3.5%, and especially less than 2%.

In another embodiment the ethylene/$C_6$–$C_{10}$-α-olefin is an ethylene-octene copolymer.

In yet another embodiment the pouch contains from about 0.1 to 5 liters, particularly from 1 to 2 liters, of a flowable material.

In another embodiment the pouch contains from about 1.25 to 2.5 liters of a liquid or emulsion and the film thickness is from about 51 to 127 μm.

In a further embodiment the pouch contains from about 0.25 to 1.2 liters of a flowable liquid and the film thickness is from 25 to 63 μm.

As used herein the term "flowable material" does not include gaseous materials, but encompasses materials which are flowable under gravity or may be pumped. Such materials include liquids e.g. milk, water, fruit juice, oil; emulsions e.g. ice cream mix, soft margarine; pastes e.g. meat pastes, peanut butter; preserves e.g. jams, pie fillings marmalade; jellies; doughs; ground meat e.g. sausage meat; powders e.g. gelatin powders, detergents; granular solids e.g. nuts, sugar; and like materials. The invention is particularly useful for flowable foods e.g. milk.

The present invention also provides, in a process for making pouches filled with a flowable material, using a vertical form and fill machine, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of film made from a material comprising from about 50 to 100 parts by weight of a first linear copolymer of ethylene and a $C_6$–$C_{10}$ α-olefin having a density of from 0.916 to 0.930 g/cm$^3$ and a melt index of 0.3 to 2.0 dg/min, and from 0 to 50 parts by weight of at least one polymer selected from the group consisting of a linear copolymer, of ethylene and a $C_4$–$C_{10}$ α-olefin having a density of from 0.916 to 0.930 g/cm$^3$ and a melt index of from 0.3 to 2.0 dg/min, and a high-pressure polypolyethylene having a density of from 0.916 to 0.924 g/cm$^3$ and a melt index of from about 1 to 10 dg/min and blends thereof, said film being selected on the basis of providing (a) pouches with an M-test value substantially smaller at the same film thickness, than that for pouches made with film of a blend of 85 parts of a linear ethylene/butene-1 copolymer having a density of about 0.919 g/cm$^3$ and a melt index of about 0.75 dg/min and 15 parts of a high pressure polyethylene having a density of about 0.918 g/cm$^3$ and a melt index of 8.5 dg/min, or (b) an M(2)-test value of less than about 12%, for pouches having a volume of from greater than 1.3 to 5 liters, or (c) an M(1.3)test value of less than about 5% for pouches having a volume of from 0.1 to 1.3 liters.

In a preferred embodiment, pouches have an M-test at least 30% less than that for pouches made from film of said blend of ethylene-butene copolymer and high pressure polyethylene.

In a preferred embodiment the sealant film for pouches of from greater than 1.3 to 5 liters in volume is selected on the basis of providing an M(2)-test value of less than 6%, and more especially less than 3%.

In a further embodiment the sealant film, for 0.1 to 1.3 liters pouches, is selected on the basis of an M(1.3)-test value of less than 5%, especially less than 3.5% and more especially less than 2%.

In another embodiment the film is made from a blend of from 60 to 100 parts by weight of an ethylene-octene copolymer having a density of from 0.916 to 0.930 g/cm$^3$ and a melt index of 0.3 to 2.0 dg/min and from 0 to 40 parts by weight of a high pressure polyethylene having a density of from 0.916 to 0.924 g/cm$^3$ and a melt index of from about 1 to 10. dg/min.

In another embodiment the sealant film is made using a blown film process in which process the blown film is cooled by passing the film in close proximity to a cooled metal mandrel. In a preferred embodiment the cooled metal mandrel is in close proximity to the inside surface of the blown film.

In another aspect of the invention, the sealant film forms a part of a composite film. The composite film may be a coextruded film, a coated film or a laminated film. In all of the pouches of the present invention the sealant film referred to hereinbefore is at least on the inside of the pouch. The end use for the pouch tends to dictate, in a large degree, the selection of the other material or materials used in combination with the sealant film. For example nylon may be used in combination with the sealant web, for packaging oleagenous substances e.g. cooking oil, motor oil; polyvinylidene chloride or ethylene-vinyl alcohol copolymers may be used in combination with the sealant web where a flavour or aroma barrier is desirable. It will be appreciated by those skilled in the art that a composite film having a sealant film only on the inside of the pouch would be sufficient for pouches made with a longitudinal fin seal, whereas a composite film having sealant films on the two outer layers of the composite film would be necessary for pouches made with a longitudinal lap seal.

Examples of composite films useful in the present invention are:

sealant film—oriented or cast nylon film laminate
sealant film—oriented or cast nylon film-sealant film laminate
sealant film—polyester film-sealant film laminate
sealant film—PVDC coating-sealant film laminate
sealant film—ethylene/vinyl alcohol copolymer coextrudate
white sealant film—dark e.g. black, red, sealant film laminate or coextrudate
white sealant film—dark sealant film-white sealant film laminate or coextrudate.

It should be noted that where composite films are used to form the pouches of the present invention the M-test values are those determined for pouches made from the sealant film and not M-test values determined for pouches made from the composite film. Stated in another way, it is the sealant film, not the composite film, which is selected on the bases of the M-test results. The sealant film selected may then form a part of a composite film.

When composite films in which the two outer layers are a sealant film as defined herein, the two sealant films may be made from the same or different polymers or blends. Preferably, however, they are the same polymers or blends. It is to be understood that the composite film may consist of two layers of sealant film. This latter composite film is useful when both layers are coloured with different dyes or pigments, for example.

A surprising feature of the sealant films used in the present invention is that the presence of pigments appears to have little effect upon the performance, e.g. integrity, of pouches made therefrom. This is in contradistinction to prior art pouches in which the presence of pigments in the films used heretofore has a marked effect upon pouch performance. The lack of effect of pigments in the present sealant film on pouch performance is of particular interest for milk pouches made from a composite film in which the composite film comprises a layer having carbon black, iron oxide, aluminum, bronze powder or some other dark pigment and an outer layer which contains a light pigment e.g. titanium oxide, zinc oxide.

A pouch of milk may have a layer of sealant film on the inside of the pouch, said sealant film being colorless, or light colored, a layer adjacent to the sealant film, said adjacent layer being dark colored, and an outer layer which is light colored. The light color on the outside of the pouch is generally for aesthetic effect in that consumers tend to object to milk being packaged in dark colored pouches. The dark color of the adjacent layer protects the milk from the effects of light, as disclosed in "Over de Smaak Van Gepasteuriseerde Milk Verpakt in Zakjas Van Polyetheen", Nizo Nieuws 1966 by H. T. Badings and L. Radema. The outer layer generally requires a pigment loading of about 8–12 wt % in the event that the pigment is titanium dioxide, in order to mask the underlying dark color e.g. an underlying layer having a pigment loading of 2 wt % carbon black. A pigment loading as high as about 15 wt % pigment e.g. titanium dioxide, in a sealant film useful for the present invention appears to have little effect upon pouch performance compared to pouches made from a colorless sealant film.

It has also been found that pouches made from sealant films, which are either clear or contain pigments perform substantially better in the M-test when the sealant film has been rapidly quenched during manufacture. A preferred method for rapidly quenching the sealant film is the so-called blown film process in which process the film, while in the plastic formative state, is cooled using an internal and or external cooling mandrel. An internal mandrel process, described in Canadian Pat. No. 893 216, is sometimes referred to herein as the IM process.

The M-tests are hereinafter described in detail. In general terms the M-test is a drop test carried out on 2-liter or 1.3 liter water-filled pouches. The test carried out on a 2 liter pouch may be designated the M(2)-test and that carried out on a 1.3 liter pouch may be designated the M(1.3)-test. In the M(2)-test, pouches containing 2-liters of water are made from 38.3 cm wide web of film, on a Prepac IS-6 vertical form and fill machine. The web of film is formed into a continuous tube with a lap seal, said tube having an inside diameter of 11.7 cm. In the M(1.3)-test, pouches containing 1.3 liters of water are made from a 32.4 cm. wide film web, on a Prepac IS-6 vertical form and fill machine. The web of film is formed into a continuous tube with a lap seal, said tube having an inside diameter of approximately 9.75 cm. Each pouch size will require an appropriate set of forming plates to handle the corresponding film web width. The vertical sealing jaw of the Prepac IS-6 machine has a 3.5 by 0.33 mm rectangular sealing wire made of Nichrome* alloy. The transverse sealing jaw of the machine has a 1.8 by 0.69 mm sealing wire made of Nichrome* alloy. Preferably, operation of the vertical and transverse sealing element is optimized for the particular film type and film thickness used. Typically, during vertical sealing of the tube, a 35–50 amp current at 14–24 volts is passed through the sealing wire for 0.24–0.45 seconds. The force applied by the vertical sealing jaws to the film is about 8.2 N applied for a dwell time of about 0.9 seconds. The vertical sealing jaw is cooled by water at 13°±6° C. During transverse sealing of the tube, a 35–55 amp current at 10–15 volts is passed through the sealing wire for 0.24–0.45 seconds. The force applied by the transverse sealing jaws to the film is about 19 N applied for a dwell time of about 0.9 seconds. The transverse sealing jaw is cooled by water at 13°±6° C. Both sealing jaws have 152 μm thick glass fiber tape impregnated with Teflon* polytetrafluoroethylene resin. With respect to optimizing the sealing operations it will be recognized that the sealing conditions (e.g. amperage, voltage, dwell time) depend on the gauge and melting characteristics of the film. For example a 51 μm film would require lower amperage and voltage, as controlled by the rheostat on the machine, than would a 76 μm film. Typically such a gauge change requires an adjustment of approximately 10% of the rheostat range. Water-filled pouches so formed are dropped onto a concrete floor from a height of 152.4 cm after the temperature of the water has reached room temperature i.e. 20°±4° C. The pouches are positioned with the longitudinal axis of the tube i.e. pouch, coincident with an imaginary vertical line.

*denotes trademark.

Any pouch from which water flows or weeps after the pouch has been dropped onto the floor, is termed a "leaker". The number of leakers, expressed as a percentage of the total number of pouches dropped is the M-test value for the particular film being tested. It will be noted that the M-test value will be affected by the thickness of the film as well as the material from which the film is made. For example pouches made from one ethylene/octene copolymer displayed an M(2)-test value of 11.6 when the film had a thickness of 51 μm and an M(2)-test value of 0.4 when the film had a thickness of 76 μm.

It should be noted that it is in the sealant film that is selected upon the basis of the M-test values. It is to be understood, therefore, that pouches made with other pouch-forming machines come within the scope of the present invention.

It will be noted by those skilled in the art that statistically significant results can only be obtained with a sample population of adequate size. Typically a sample population of 2000 pouches tested in cycles of 500 against an internal standard (e.g. 76 μm film from Film A disclosed below), gives statistically significant results.

The linear ethylene/$C_6$–$C_{10}$ α-olefin copolymer and ethylene/$C_4$–$C_{10}$ α-olefin copolymer useful in the present invention may be made from ethylene and the α-olefin by a process disclosed in Canadian Pat. No. 856 137 which issued 1970 November 7 to W. E. Baker, I.C.B. Saunders and J. M. Stewart. Other processes may also be used to produce the linear ethylene/α-olefin copolymers useful in the present invention.

The blends useful in the present invention may be made by blending the constituents prior to feeding to the hopper of a film extruder, or may be made by blending the constituents at the time of extrusion just prior to remelting in the extruder, or alternatively the constituents may be melt blended in the extruder.

The ethylene/$C_6$–$C_{10}$ α-olefin copolymer or ethylene/$C_6$–$C_{10}$ α-olefin/other polymer blend, (e.g. in pellet form), may then be fed into a film extruder and extruded into film form. A preferred film manufacturing method is the so-called blown film process disclosed in Canadian Pat. No. 460 963 issued Nov. 8, 1949 to E. D. Fuller. Films may also be made using an internal or external cooling mandrel with the blown film process, as disclosed for example in Canadian Pat. No. 893 216 issued Feb. 15, 1972 to M. Bunga and C. V. Thomas. As indicated hereinbefore the internal cooling mandrel blown film process is preferred.

The film, after manufacture, is slit longitudinally into appropriate widths. The width is selected on the basis of the diameter of the tube to be formed on the vertical form and film machine.

It will be understood by those skilled in the art that additives e.g. UV stabilizers, anti-block agents, slip additives, may be added to the polymers from which the pouches of the present invention are made.

As indicated hereinbefore, examination of melt strength, hot tack strength and heat seal strength data for the linear ethylene/$C_6$–$C_{10}$ α-olefin copolymer used in the present invention leads one skilled in the art to believe that there would be no improvement in the number of leakers with pouches made from such copolymer compared to that experienced with pouches made from a blend of linear ethylene-butene copolymer and high pressure polyethylene. In order to illustrate the lack of correlation between melt strength, hot tack strength and heat seal strength with pouch performance several samples of films were taken and melt strength, hot tack strength and heat seal strength were measured. 2 liter pouches of water were made from such film and tested by the (M-2)-test as described hereinbefore.

TABLE I

| Film | Film Thickness μm | Melt Strength (g/3 min) | Heat Seal Strength (g/12.7 mm) 180° C. | Hot Tack Strength (g/25.4 mm) 190° C. | M(2)-Test Value |
|---|---|---|---|---|---|
| A | 51 | 0.31 | 2080 | 300 | 100 |
| A | 76 | 0.31 | 2080 | 300 | 11.6 |
| B | 76 | 0.63 | 2040 | 300 | 2.3 |
| C | 76 | 0.38 | 2300 | 300 | 1.7 |
| D | 51 | 0.29 | 1950 | 800 | 10.3 |
| E | 51 | 0.49 | 1397 | 500 | 0.4 |

Film A was made from a blend of 85 parts of a linear ethylene/butene-1 copolymer having a density of 0.919 g/cm$^3$ and a melt index of 0.75 dg/min and 15 parts of a high pressure polyethylene having a density of 0.918 g/cm$^3$ and a melt index of 8.5 dg/min.

Film B was made from a blend of 85 parts of the blend of Film A and 15 parts of an ethylene/vinyl acetate copolymer having a melt index of 0.35 dg/min and a vinyl acetate content of 12 wt%.

Film C was made from a blend of 85 parts of the blend of Film A and 15 parts of an ethylene/vinyl acetate copolymer having a melt index of 0.7 dg/min and a vinyl acetate content of 18 wt%.

Film D was made from an ethylene/octene-1 copolymer having a density of 0.918 g/cm$^3$ and a melt index of 0.84 dg/min.

Film E was made from 80 parts of the ethylene/octene copolymer of Film D and 20 parts of an ethylene/vinyl acetate copolymer having a melt index of 0.35 dg/min and a vinyl acetate contact of 12 wt.%.

Pouches made from Film D are within the scope of the present invention; pouches made from Films A–C and E are not.

Melt strength is the weight of extrudate which will remain suspended for a period of 3 minutes from the orifice of a standard melt index tester, described in the procedure of ASTM D1238-79.

Heat seal strength is determined using a peel strength test similar to that used in ASTM Procedure D903 on a sample of film sealed using a Sentinel* heat seal apparatus. Hot tack strength may be determined by ASTM Procedure D3706.

*denotes trademark.

It will be seen from Table I above that there does not appear to be any direct correlation between melt strength, heat seal strength or hot tack strength and M(2)-test values. It is believed that M(2) test values correlate more closely with commercial experience with respect to the percentage of damaged pouches, and for this reason M-test values form the basis upon which films falling within the scope of the present invention are selected.

The following examples further serve to illustrate the invention:

EXAMPLE I

Films of the following resins and/or resin blends were evaluated for their performance as liquid packaging films:
(A) 85 parts of a linear ethylene/butene-1 copolymer having a density of 0.919 g/cm$^3$ and a melt index of 0.75 dg/min. blended with 15 parts of a high pressure polyethylene having a density of 0.918 g/cm$^3$ and a melt index of 8.5 dg/min;
(B) an ethylene/octene-1 copolymer having a density of 0.918 g/cm$^3$ and a melt index of 0.84 dg/min;
(C) 80 parts of the ethylene/octene copolymer of B, blended with 20 parts of an ethylene-vinyl acetate copolymer having a melt index of 0.35 dg/min and a vinyl acetate content of 12%;
(D) 50 parts of the ethylene/octene-1 copolymer B, blended with 50 parts of the resin blend of A;
(E) an ethylene/octene-1 copolymer having a density of 0.925 g/cm$^3$ and a melt index of 1.1 dg/min;
(F) an ethylene/octene-1 copolymer having a density of 0.929 g/cm$^3$ and a melt index of 0.70 dg/min.

Pouches made from Resins A and C are not within the scope of the present invention. Pouches made from resin C come within the scope of U.K. patent application No. 82/016101 filed 1982 June 02.

The resins or resin blends were extruded at a melt temperature of 232° C., into films of various gauges at 409 kg/hr using an extruder equipped with a 81.3 cm diameter circular die at a melt temperature of 232° C., and the resulting films were cooled by an internal cooling mandrel.

The films were subsequently processed into 2 liter pouches using a Prepac IS-6 liquid packaging machine and tested to determine the M-test value as previously described.

TABLE II

| Run | Resin | Film Thickness μm | M-Test Value |
|---|---|---|---|
| 1 | A | 51 | 100 |
| 2 | A | 76 | 11.3 |
| 3 | A | 102 | 11.3 |
| 4 | B | 51 | 11.6 |
| 5 | B | 76 | 0.4 |
| 6 | C | 51 | 2.4 |
| 7 | D | 51 | 22.5 |
| 8 | E | 51 | 59.7 |
| 9 | F | 51 | 66.4 |

As the M-test was conducted on 2 liter pouches the M-test values shown in Table II are also M(2)-test values it will be seen from Table II that the pouches of Runs 4 and 5 have M(2)-test values within the scope of the present invention. It will also be seen that although pouches of Runs 7, 8 and 9 do not meet the criteria for the M(2)-test, the M-test values are substantially less than the M-test value for pouches made from resin A. Resin A is a resin meeting the criteria for the linear ethylene/butene-1 copolymer indicated on page 4 line 31 to page 5 line 1 of the present specification, and so pouches for Runs 7, 8 and 9 thus come within the scope of the present invention.

EXAMPLE II

Films of the following resins and/or resin blends were evaluated for their performance as liquid packaging films:
(A) 85 parts of an ethylene/butene-1 copolymer having a density of 0.919 g/cm$^3$ and a melt index of 0.75 dg/min. blended with 15 parts of a high pressure polyethylene having a density of 0.918 g/cm$^3$ and a melt index of 8.5 dg/min;
(B) an ethylene/octene-1 copolymer having a density of 0.918 g/cm$^3$ and a melt index of 0.84 dg/min;
(G) an ethylene/octene-1 copolymer having a density of 0.920 g/cm$^3$ and a melt index of 1.0 dg/min;
(H) the ethylene-octene copolymer in B above blended with 15% of a high pressure polyethylene having a melt index of 6.5 dg/min and a density of 0.917 g/cm$^3$;
(J) the ethylene/octene copolymer in G blended with 30% of the high pressure polyethylene described in H.

The resins or resin blends were extruded at a melt temperature of 232° C. into films of various gauges at 409 kg/hr using an extruder equipped with an 81.3 cm diameter circular die, and the resulting films were cooled by an internal cooling mandrel.

The films were subsequently processed into 1.3 liter pouches using a Prepac IS-6 liquid packaging machine and tested to determine the M-test value as previously described.

TABLE III

| Run | Film | Film Thickness μm | M(1.3)-Test Value |
|---|---|---|---|
| 10 | A | 51 | 3.7 |
| 11 | " | 76 | 1.9 |
| 12 | B | 76 | 0.2 |
| 13 | G | 76 | 0.4 |
| 14 | H | 76 | 0.2 |
| 15 | J | 76 | 0.4 |

All pouches in this example, with the exception of those made from resin A, fall within the scope of the present invention.

EXAMPLE III

Several films were produced by a blown film process. Pouches containing 2 liters of water were then produced using a Prepac IS-6 liquid packaging machine and the pouches were subjected to the M-test.
(C-1:) 76 μm film was made by the IM process from a resin blend comprising 85 parts of an ethylene/butene-1 copolymer having a density of 0.919 g/cm$^3$ and a melt index of 0.75 dg/min and 15 parts of a high pressure polyethylene having a density of 0.918 g/cm$^3$ and a melt index of 8.5 dg/min.
(C-2:) 76 μm film was made by the IM process from 96 parts by weight of the resin blend of film (C-1) and 4 parts by weight of titanium dioxide pigment.
(C-3:) 76 μm film was made by the IM process from 92 parts by weight of the resin blend of film (C-1) and 8 parts by weight of titanium dioxide pigment.
(C-4:) 76 μm film was made by the IM process from an ethylene/octene-1 copolymer having a density of 0.918 g/cm$^3$ and a melt index of 0.84 dg/min.
(C-5:) 76 μm film wash made by the IM process from 96 parts by weight of the ethylene/octene-1 copolymer of film C-4 and 4 parts weight of titanium dioxide pigment.

(C-6:) 76 μm film wash made by the IM process from 92 parts by weight of the ethylene/octene-1 copolymer of film (C-4) and 8 parts by weight of titanium dioxide pigment.

(C-7:) 76 μm film was made by a so-called conventional blown film process (non-IM) using the pigmented ethylene/octene-1 copolymer of film (C-6).

TABLE IV

| Run | Film | M-2 test values |
| --- | --- | --- |
| 16 | C-1* | 28 |
| 17 | C-2* | 44 |
| 18 | C-3* | 48 |
| 19 | C-4 | 1.8 |
| 20 | C-5 | 0.2 |
| 21 | C-6 | 0.7 |
| 22 | C-7 | 13 |

*Pouches made from films C-1, C-2 and C-3 do no not fall within the scope of the present invention. The results for pouches made from films C-1, C-2 and C-3 are included to show the dramatic deterioration in pouch performance for films of the prior art when pigments are added thereto. In marked contrast pouches of the present invention, represented by pouches made from films C-4, C-5 and C-6, in Runs 19-21, show that addition of pigment at relatively high loadings have little negative effect, if any, upon pouch performance.

A comparison of M-2 test values for pouches made from films C-6 and C-7 illustrates the difference between the performance of sealant films made by conventional blown film processes and those made by fast-quench processes e.g. the IM process.

The embodiments of the invention in which an exclusive property or privilege is claimed are defined as follows:

1. A pouch containing a flowable material, said pouch being made from a sealant film in tubular form and having transversely heat-sealed ends, said sealant film being made from a material comprising about 50 to 100 parts of a linear copolymer of ethylene and an octene-1 having a density of from 0.916 to 0.930 g/cm$^3$ and a melt index of 0.3 to 2.0 dg/min, and from 0 to 50 parts by weight of at least one polymer selected from the group consisting of a linear copolymer, of ethylene and a C$_4$–C$_{10}$ α-olefin having a density of from 0.916 to 0.930 g/cm$^3$ and a melt index of from 0.3 to 2.0 dg/min, and a high-pressure polyethylene having a density of from 0.916 to 0.924 g/cm$^3$ and a melt index of from about 1 to 10 dg/min, said sealant film being selected on the basis of providing (a) pouches with an M-test value substantially smaller at the same film thickness, than that of pouches made with film of a blend of 85 parts of a linear ethylene/butene-1 copolymer having a density of about 0.919 g/cm$^3$ and a melt index of about 0.75 dg/min and 15 parts of a high pressure polyethylene having a density of about 0.918 g/cm$^3$ and a melt index of 8.5 dg/min, or (b) an M(2)-test value of less than about 12%, for pouches having a volume of from greater than 1.3 to 5 liters, or (c) M(1.3)-test value of less than about 5% for pouches having a volume of from 0.1 to 1.3 liters.

2. A pouch according to claim 1 wherein the M-test value for said pouch is at least 30% less than that for pouches made from film of said blend of ethylene-butene copolymer and high pressure polyethylene.

3. A pouch according to claim 1 in which the sealant film is made from a blend of from 60 to 100 parts by weight of an ethylene-octene copolymer and from 0 to 40 parts by weight of a high-pressure polyethylene.

4. A pouch, according to claim 1 having a volume of from greater than 1.3 liters to 5 liters wherein the M(2)-test value is less than 6%.

5. A pouch according to claim 1 wherein the flowable material is a liquid or an emulsion.

6. A pouch according to claim 2 wherein the sealant film is made using a blown film process in which process the blown film is cooled by passing the film in close proximity to a cooled metal mandrel.

7. A pouch according to claim 2 wherein the sealant film contains a pigment.

8. A pouch according to claim 2 wherein the sealant film forms a part of a composite film, said sealant film being at least on the inside of the pouch.

9. A pouch containing a flowable material, said pouch being made from a composite film in tubular form and having transversely heat-sealed ends, said composite film containing at least one layer of a sealant film, at least one layer of the sealant film being made from a material comprising about 50 to 100 parts of a linear copolymer of ethylene and octene-1 having a density of from 0.916 to 0.930 g/cm$^3$ and a melt index of 0.3 to 2.0 dg/min, and from 0 to 50 parts by weight of at least one polymer selected from the group consisting of a linear copolymer, of ethylene and a C$_4$–C$_{10}$ α-olefin having a density of from 0.916 to 0.930 g/cm$^3$ and a melt index of from 0.3 to 2.0 dg/min, and a high-pressure polyethylene having a density of from 0.916 to 0.924 g/cm$^3$ and a melt index of from about 1 to 10 dg/min, said sealant film being selected on the basis of providing (a) pouches made from said sealant film with an M-test value substantially smaller at the same film thickness, than that of pouches made with film of a blend of 85 parts of a linear ethylene-butene-1 copolymer having a density of about 0.919 g/cm$^3$ and a melt index of about 0.75 dg/min and 15 parts of a high pressure polyethylene having a density of about 0.918 g/cm$^3$ and a melt index of 8.5 dg/min, or (b) an M(2)-test value of less than about 12%, for pouches having a volume of from greater than 1.3 to 5 liters, or (c) M(1.3)-test value of less than about 5% for pouches having a volume of from 0.1 to 1.3 liters.

10. A pouch according to claim 9 wherein the sealant film is selected upon the basis of the M-test value being at least 30% less than that for pouches made from film of said blend of ethylene-butene copolymer and high pressure polyethylene.

11. A pouch according to claim 9 wherein the flowable material is milk and the composite film comprises at least one layer of sealant film containing a dark pigment and at least one layer of sealant film containing a light pigment.

12. A pouch according to claim 9 wherein the flowable material is milk and the composite film comprises at least one layer of sealant film containing a pigment selected from carbon black, iron oxide, aluminium and bronze, and at least one layer of sealant film containing a pigment selected from titanium dioxide and zinc oxide.

13. A pouch according to claim 9 wherein the composite film comprises at least one layer of said sealant film and a layer selected from nylon film, polyester film, ethylene/vinyl alcohol copolymer film and polyvinylidene chloride film.

* * * * *